US012595418B2

(12) United States Patent
Bodratti et al.

(10) Patent No.: US 12,595,418 B2
(45) Date of Patent: Apr. 7, 2026

(54) FIBER-CONTAINING FIRE PROTECTION MATERIAL

(71) Applicant: UNIFRAX I LLC, Tonawanda, NY (US)

(72) Inventors: Andrew Bodratti, Buffalo, NY (US); Jonathan Cross, Clarence Center, NY (US); Alexander J. Manly, Amherst, NY (US); Trevor West, Buffalo, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 520 days.

(21) Appl. No.: 18/181,801

(22) Filed: Mar. 10, 2023

(65) Prior Publication Data

US 2023/0265347 A1     Aug. 24, 2023

Related U.S. Application Data

(63) Continuation of application No. PCT/US2023/063125, filed on Feb. 23, 2023.

(60) Provisional application No. 63/268,434, filed on Feb. 24, 2022.

(51) Int. Cl.
| | |
|---|---|
| *C09K 21/02* | (2006.01) |
| *C09D 7/61* | (2018.01) |
| *C09D 183/04* | (2006.01) |
| *C09K 21/06* | (2006.01) |
| *C09K 21/14* | (2006.01) |
| *H01M 4/13* | (2010.01) |

(52) U.S. Cl.
CPC ................ *C09K 21/02* (2013.01); *C09D 7/61* (2018.01); *C09D 183/04* (2013.01); *C09K 21/06* (2013.01); *C09K 21/14* (2013.01); *H01M 4/13* (2013.01)

(58) Field of Classification Search
None
See application file for complete search history.

(56) References Cited

U.S. PATENT DOCUMENTS

| | | | |
|---|---|---|---|
| 4,792,478 A | 12/1988 | Taylor et al. |
| 5,176,857 A | 1/1993 | Stacey et al. |
| 6,090,191 A | 7/2000 | Atlanova et al. |
| 8,551,897 B2 | 10/2013 | Zoitos et al. |

(Continued)

FOREIGN PATENT DOCUMENTS

| | | |
|---|---|---|
| EP | 0 466 302 A1 | 1/1992 |
| JP | 2008266841 A | 11/2008 |

(Continued)

OTHER PUBLICATIONS

International Search Report and Written Opinion issued by the United States Patent and Trademark Office as International Searching Authority for International Application No. PCT/US2023/063125, dated Sep. 7, 2023, 10 pgs.

(Continued)

*Primary Examiner* — Colin W. Slifka
(74) *Attorney, Agent, or Firm* — Haynes and Boone, LLP

(57) ABSTRACT

A fire protection material includes at least 10 wt % of inorganic fibers, at least 5 wt % of an additive dispersed within the inorganic fibers, the additive selected from fibers, particles, platelets, aerogels, a foam, or combinations thereof; and at least 2 wt % of a binder dispersed within the inorganic fibers. The inorganic fibers, additive, and binder account for at least 60 wt % of the fire protection material.

21 Claims, 7 Drawing Sheets

(56) References Cited

U.S. PATENT DOCUMENTS

| | | |
|---|---|---|
| 8,663,774 B2 | 3/2014 | Fernando et al. |
| 2011/0126957 A1 | 6/2011 | Wierzbicki et al. |
| 2016/0311207 A1 | 10/2016 | Fernando et al. |
| 2018/0345262 A1 | 12/2018 | Ou |
| 2020/0369893 A1 | 11/2020 | Zoitos et al. |
| 2021/0074960 A1 | 3/2021 | Stude et al. |

FOREIGN PATENT DOCUMENTS

| | | |
|---|---|---|
| JP | 2010-515831 A | 5/2010 |
| WO | WO 2022/024076 A1 | 2/2022 |

OTHER PUBLICATIONS

Extended European Search Report for European Patent Application No. 23760916.9 issued by the European Patent Office, dated Jan. 28, 2026. (11 pgs.).

FIBER-CONTAINING FIRE PROTECTION MATERIAL

CROSS-REFERENCE TO RELATED APPLICATIONS

This application is a continuation of PCT International Patent Application No. PCT/US2023/063125 filed Feb. 23, 2023, and entitled "Fiber-Containing Fire Protection Material," which claims priority to U.S. Provisional Application No. 63/268,434 filed Feb. 24, 2022, entitled "Fiber-Containing Fire Protection Material," which are incorporated herein by reference in their entirety.

FIELD OF THE DISCLOSURE

The present disclosure relates to a fiber-containing composition for fire protection between lithium-ion battery cells. The fiber-containing fire protection material is compressible such that fire protection properties can be maintained as lithium-ion cells swell over time.

BACKGROUND

Lithium-ion batteries (LiB) are increasingly being used in various industries, including electric vehicles (EVs), due to their high energy density and cycling characteristics. LiB cells have known drawbacks such as being prone to thermal runaway, wherein a failure in a single cell may propagate to surrounding cells and cause the LiB to combust.

Typically, fire protection materials are brittle and inflexible. That is, when exposed to stresses such as impact or vibration, many fire protection materials will fracture. This is problematic in LiB applications due to the swelling of the LiB cells both during cycling and over time. As such, there remains a need for a fire protection material that is capable of maintaining low thermal conductivity during the life of a LiB.

BRIEF DESCRIPTION OF THE DRAWINGS

Various embodiments of the present disclosure will be understood more fully from the detailed description given below and from the accompanying drawings. In the drawings, like reference numbers may indicate identical or functionally similar elements. Embodiments are described in detail hereinafter with reference to the accompanying figures, in which.

DETAILED DESCRIPTION

Figure 1:
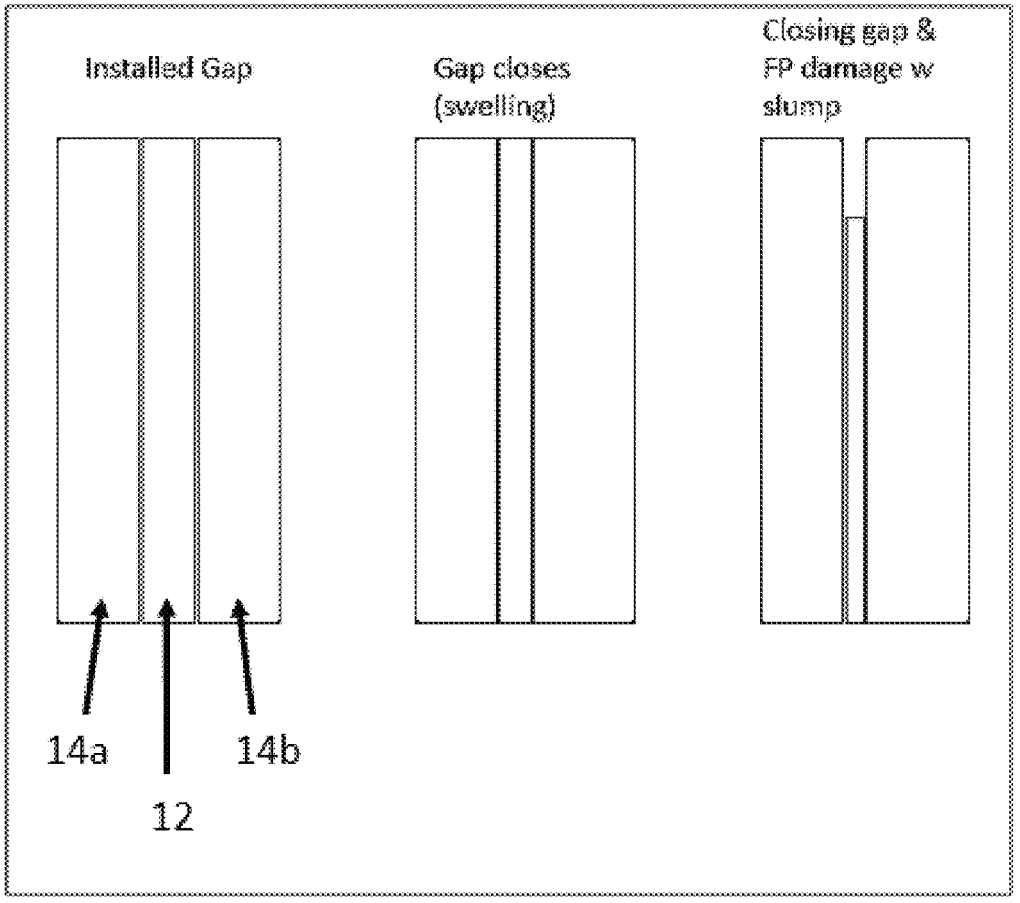
FIG. 1 is a prior art fire protection material disposed between lithium-ion battery cells.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, existing fire protection composites 12 are brittle and, when positioned in a gap between lithium-ion cells 14a, 14b may be damaged due swelling of the cells 14a, 14b and the consequent closing of the gap therebetween. As the cells 14a, 14b expand and contract during cycling, this damage to the fire protection composites 12 can cause the fire protection composites 12 to slump such that areas within the gap are no longer covered by the fire protection composites 12. This is especially true in high impact applications such as electric vehicles as the vibrations and movement of the electric vehicle will accelerate the slump of the fire protection composites 12.

According to embodiments of the present disclosure, a fiber-containing fire protection material is provided having sufficient compressibility and mechanical strength in order to maintain thermal characteristics from the beginning of life (BoL) to the end of life (EoL) of a LiB. As used herein, EoL is the end of the working life of a battery including the fire protection material, wherein capacity is diminished to the point of needing to replace the battery. This point may be reached, for example, after a set number of cycles (e.g., 1,000, 5,000, or 10,000 cycles), after a set number of years of operation of the battery (e.g., 2 years, 5 years, 8 years, or 10 years), after a set number of miles driven in an electric vehicle using the battery (e.g., 50,000 miles, 100,000 miles, 200,000 miles, or 250,000 miles), after the capacity is decreased below a set percentage of a peak capacity of the battery (e.g., 85%, 80%, 75%, 70%, 65%, 60%, 50%, 40%, or 30% of the peak capacity), or a combination of these thresholds. For instance, in some embodiments, the EoL may be set as the earliest of when an EV using the battery reaches 100,000 miles, 8 years, or when the battery falls below 70% of peak capacity. Maintaining sufficient compressibility and mechanical strength from BoL to EoL avoids the problems with slump discussed above thereby enabling the fire protection material to suppress thermal runaway throughout the LiB's life.

Flammability

The fire protection material of the present disclosure is flame resistant and, when employed in a LiB, can help reduce propagation of flames between cells of the LiB. In some embodiments, the fire protection material is classified as a V-2, V-1, V-0, 5VB, or 5VB material under UL94. In some embodiments, the fire protection material is flame resistant (i.e., does not melt) at a temperature of at least 600° C., at least 700° C., at least 800° C., at least 900° C., at least 1000° C., at least 1100° C., at least 1150° C., at least 1200° C., at least 1250° C., at least 1260° C., or at least 1300° C. In some embodiments, the fire protection material is certified as flame resistant under UL 723, ASTM E84, ASTM E136, ASTM E1529, and/or UL 1709. In some embodiments, the fire protection material is rated as A2-s1, d0 or better under EN13501-1. The fire protection material may exhibit any one or more of the foregoing properties at both the BoL of a battery including the fire protection material and the EoL of the battery.

Thermal Conductivity

The fire protection material of the present disclosure has low thermal conductivity which allows the material to be as thin as possible consuming a minimal amount of space in a LiB battery pack. This allows the manufacturer to minimize the size of the pack (containing multiple battery cells) and maximize the energy density of the pack. In some embodiments, the fire protection material has a thermal conductivity (measured per ASTM C201) of at most 0.10, at most 0.08, at most 0.06, at most 0.05, at most 0.04, at most 0.035, at most 0.03, at most 0.025, at most 0.02, at most 0.015, or at most 0.01 W/m-K at 0° C., 10° C., 20° C., 30° C., 40° C., 50° C., 60° C., 70° C., 80° C., 90° C., and/or 100° C. In some embodiments, the fire protection material has a thermal conductivity of at most 0.14, at most 0.12, at most 0.10, at most 0.08, at most 0.07, at most 0.05, at most 0.04, at most 0.035, at most 0.03, at most 0.025, at most 0.02, at most 0.015, or at most 0.01 W/m-K at 100° C., 200° C., 300° C., 400° C., 500° C., 600° C., 700° C., 800° C., 900° C., and/or 1000° C. The fire protection material may exhibit any one or more of the foregoing properties at both the BoL of a battery including the fire protection material and the EoL of the battery.

Electrical Conductivity

The fire protection material of the present disclosure has a low electrical conductivity, which may reduce the incidence of thermal runaway (that is often caused by internal and external short circuits). The fire protection material may maintain this property even after thermal runaway. In some embodiments, the fire protection material has a dielectric strength, measured under ASTM D149-Method C, of at least 5 kV/mm, at least 6 kV/mm, at least 7 kV/mm, at least 8 kV/mm, 5 kV/mm to 15 kV/mm, 6 kV/mm to 12 kV/mm, or 7 kV/mm to 10 kV/mm. The fire protection material may exhibit the foregoing properties at both the BoL of a battery including the fire protection material and the EoL of the battery.

Compressibility

The fire protection material of the present disclosure has controlled compression properties which allows the material to have good flame resistance, low thermal conductivity, and low electrical conductivity even under compression. In some embodiments, the fire protection material maintains or improves its flame resistance, thermal conductivity, and/or electrical conductivity when under compression. These controlled compression properties maintain load as cells are installed in the LiB pack and swell with time thereby limiting damage to typically brittle fire protection materials. In some embodiments, the fire protection material has a compression recovery, measured under ASTM D3574-Test C, at the BoL of the LiB of at least 50%, at least 55%, at least 60%, at least 65%, at least 70%, or at least 75%. In some embodiments, the fire protection material has a compression recovery at the EoL of the LiB of at least 5%, at least 10%, at least 15%, at least 20%, at least 25%, or at least 30%.

Compressive strain of the fiber-containing fire protection material can be measured over a range of compression speeds ranging from 1 mm/min up to 100 mm/min (tested generally according ASTM D3574). The material evaluated may be cut to 50 mm×50 mm squares and compressed between two parallel plates at ambient pressure and temperature. Compressive curves can be generated from strains ranging from 0%, up to typical EoL values seen within LiB such as 80%. In some embodiments, the fire protection material has a compressive strain at 60% compression ranging from 50 kPa to 2,500 kPa, at 70% compression ranging from 200 kPa to 4,000 kPa, and at 80% compression ranging from 1,000 kPa to 8,000 kPa. In some embodiments, the fire protection material has a compressive strain of at least 100 kPa or at least 200 kPa throughout a compression range of 20 to 50%.

Blast Resistance

A thermal runaway event in the battery pack of an EV is not a calm or controlled event. There can be violent venting of gasses, flames, and even the expulsion of particles from within the battery cells. Thus, there is a need for insulating materials that go within a battery pack that can function as blast protection. Such materials may be positioned, for example, between the top of the battery arrays and the pack lid or between individual cells of the battery pack. The materials must be able to remain in-tact, and maintain thermal insulation, while being subjected to high-pressure flames and particulates.

According to some embodiments, the fire protection material may be a blast-resistant material. Blast resistance generally relates to the ability of a material to withstand thermal and mechanical forces and may be tested by, e.g., subjecting the material to a torch (e.g., at about 1100° C.) and feeding alumina grit through the torch. Blast-resistant materials should remain intact for a predetermined period while maintaining a cold face temperature below a set threshold.

Figure 2:
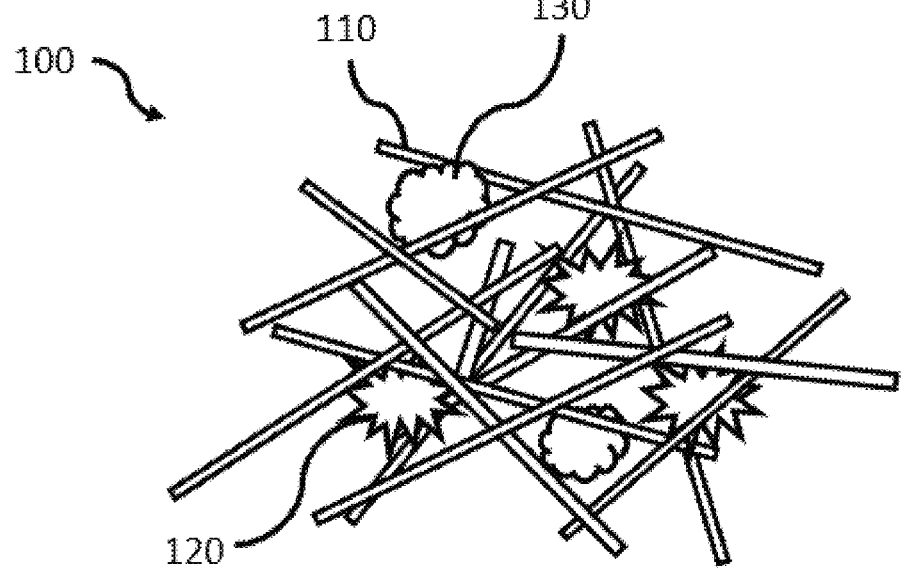
FIG. 2 is a fiber-containing fire protection material according to an embodiment of the present disclosure.

Referring to FIG. 2, in one or more embodiments, the fire protection material 100 may comprise a fiber matrix 110 having one or more additives 120, 130 dispersed or suspended therein. The fiber matrix 110 contains fibers having an aspect ratio of at least 3. The fiber matrix 110 may consist of a single type of fiber or may comprise a combination of different types of fiber. Suitable fibers that may be included in the fiber matrix 110 include microglass fibers, low bio persistent fibers (LBP), refractory ceramic fibers (RCF), and/or polycrystalline wool (PCW).

Microglass fibers may include A-glass, B-glass, C-glass, and/or E-glass fibers. In some embodiments, the microglass fibers have an average diameter of about 0.25 micrometers to 5 micrometers. In other embodiments, the microglass fibers have a diameter of at least about 3 micrometers, at least about 4 micrometers, at least about 5 micrometers, or at least about 6 micrometers.

LBP fibers are fibers that exhibit a solubility of at least 30 $ng/cm^2$-hr when exposed as a 0.1 g sample to a 0.3 ml/min flow of simulated lung fluid at 37° C. Suitable LBP fibers include alkaline earth silicate (AES) fibers such as those described in U.S. Pat. Nos. 8,663,774 and 8,551,897, which are each hereby incorporated by reference in their entireties. A useful LBP fiber is commercially available from Alkegen (Tonawanda, N.Y.) under the registered trademark INSUL-FRAX®. INSULFRAX® fibers generally comprise the fiberization product of about 61 to about 67 weight percent silica, from about 27 to about 33 weight percent calcia, and from about 2 to about 7 weight percent magnesia.

Refractory ceramic fibers (RCF) comprise alumina and silica. In some embodiments, the RCF may comprise about 50 percent by weight alumina. In some embodiments, the RCF may comprise from about 45 to about 60 percent by weight alumina and from about 40 to about 55 percent by weight silica. In some embodiments, the RCF may comprise from about 29 to about 31 percent by weight alumina, from about 53 to about 55 percent by weight silica, and from about 15 to about 17 weight percent zirconia. In some embodiments, the RCF may have an average length in the range of about 3 to about 6.5 mm, typically less than about 5 mm, and an average fiber diameter range of from about 0.5 micrometers to about 14 micrometers. A useful RCF is commercially available from Unifrax I LLC (Niagara Falls, N.Y.) under the registered trademark FIBERFRAX®. The FIBERFRAX® ceramic fibers comprise the fiberization product of a melt comprising about 45 to about 75 weight percent alumina and about 25 to about 55 weight percent silica. The FIBERFRAX® fibers exhibit operating temperatures of up to about 1540° C. and a melting point up to about 1870° C.

PCW is an aluminosilicate fiber having an alumina content of greater than 70 percent by weight or from about 72 to about 96 percent by weight. PCW is mechanically strong and, when included, may reduce the brittleness (and resultant loss of material during vibrations) of the fire protection material 100. In some embodiments, the PCW has an average diameter of at least about 3 micrometers, at least about 4 micrometers, at least about 5 micrometers, or at least about 6 micrometers. In some embodiments, a suitable PCW includes alumina fibers sold under the tradename SAFFIL® available from Unifrax I LLC (Tonawanda, NY). In some embodiments, the PCW may comprise alumina fibers such as those described in U.S. Pat. Nos. 4,792,478 and 5,176, 857, which are each hereby incorporated by reference in their entireties.

Other fibers that may be included in the fiber matrix 110 include silica yarns (continuous or chopped) and/or organic fibers such as nylon fibers, polyvinyl alcohol (PVA) fibers, aramid fibers, polyester fibers, and the like. In some embodiments, the fiber matrix 110 comprises long fibers having an average length of at least about 5 mm, at least about 10 mm, at least about 25 mm, at least about 40 mm, at least about 50 mm, at least about 70 mm, or at least about 100 mm. In some embodiments, the fiber matrix comprises a woven material that can help trap additives 120, 130 within the fiber matrix 110.

In one or more embodiments, each of the aforementioned fibers may comprise up to 100 percent by weight of the fiber matrix 110. In some embodiments, the fiber matrix 110 comprises microglass fibers or LBP fibers in an amount of at least 50 percent by weight and comprises up to 50 percent by weight of long fibers and/or strong fibers selected from PCW, silica yarn, and/or organic fibers. In such embodiments, the strong fibers may have an average diameter of at least 3 about micrometers, at least about 4 micrometers, at least about 5 micrometers, or at least about 6 micrometers. In some embodiments, the fiber matrix 110 comprises LBP fibers as a primary fiber (at least 50 percent by weight). In other embodiments, the fiber matrix 110 comprises microglass fibers as a primary fiber due to their superior insulating characteristics.

In some embodiments, the fire protection material 100 is in the form of a paper, having a thickness of from greater than about 0.1 mm to about 10 mm, about 1 mm, about 2 mm, or about 3 mm. In some embodiments, the fire protection material 100 has a basis weight of from about 40 gsm (grams per square meter) to about 3000 gsm, from about 100 gsm to about 2500 gsm, from about 200 gsm to about 1500 gsm, about 100 gsm, about 200 gsm, about 300 gsm, or about 400 gsm. In some embodiments, the fire protection material has a density of about 50 kg/m³ to about 500 kg/m³, about 100 kg/m³ to about 350 kg/m³, or about 100 kg/m³ to about 250 kg/m³.

In some embodiments, the additives 120, 130 may comprise organic binders that keep the fire protection material 100 flexible and contribute adhesion strength to keep the fire protection material 100 in position during normal operation of a device using the material (e.g., surviving vibration forces in an EV LiB). In some embodiments, the additive 120, 130 positively affects one or more properties of the fire protection material 100. For example, in some embodiments, the additive 120, 130 may lower the thermal conductivity, increase the dielectric strength, and/or increase the compressive strain of the fire protection material 100.

In some embodiments, the binder materials include latex, cellulose, silicones, PVA, polyester, or combinations thereof. In some embodiments, the binder comprises organic fibers. In such embodiments, the fire protection material 100 may be heat pressed to at least partially melt the organic fibers and bind the material. In some embodiments, the binder is included in an amount of from about 0.5 percent by weight to about 10 percent by weight, about 1 percent by weight to about 20 percent by weight, or about 5 percent by weight to about 15 percent by weight, based on a total weight of the fire protection material 100.

In some embodiments, the additives 120, 130 comprise microporous materials, platelets, aerogels, mica, micro spheres, intumescent materials, opacifiers or opacifying agents, endothermic materials, phase change materials, or other inorganic filler materials that would serve to enhance the thermal conductivity performance of the fire protection material 100 as compared to the fiber matrix 110 alone. Suitable opacifiers may include, but are not limited to, silicon carbide, graphite, TiO2, Fe2O3 and ilmenite. These opacifiers act to block IR radiation from passing through the fire protection material 100, which becomes a larger component of heat transfer as temperature increases. The additives 120, 130 may allow the paper thickness of the fire protection material 100 to be reduced, leaving more space for battery cells (i.e., increased energy density) or reducing the size of the overall battery pack.

Microporous materials may have a surface area of at least about 100 m²/g, at least about 200 m²/g, or at least 300 m²/g. In some embodiments, the microporous materials may have an average particle size of about 1 nm to about 500 micrometers, about 50 nm to about 50 micrometers, about 1 micrometer to about 5 micrometers. Suitable inorganic filler materials include silica materials, such as fumed silicas, precipitated silicas, silica gels, silica aerogels, alumina materials, zirconia materials, titania materials, or combinations thereof. The inorganic fillers may have a chemically modified surface that imparts hydrophobicity. For example, the inorganic fillers may have a hydrophobizing agent on a surface thereof. Suitable hydrophobizing agents include, but are not limited to, organohalosilanes of the chemical formula $R_nSiX_{4-n}$ such as methyldichlorosilane, dimethyldichlorosilane, ethyltrichlorosilane, diethyldichlorosilane, organo(organooxy) silanes of the chemical formula $R_nSi(OR)_{4-n}$ such as ethyl triethoxysilane, hexadecyltrimethoxysilane, organo-H-silanes of the chemical formula $R_nSiH_{4-n}$ such as methyl silane, dimethylsilane, trimethylsilane, ethylsilane, diethylsilane, triethylsilane, and organo-H-halosilanes and organo-H-alkoxysilanes of the chemical formula $R_nSiH_mX_{4-(m+n)}$ such as chlorodimethylsilane, chloro(ethoxy)(methyl)silane. Suitable platelets include, but are not limited to, coated or uncoated vermiculite, mica, clay, or talc platelets. Suitable micas may include, but are not limited to, muscovite, phlogopite, biotite, lepidolite, glauconite, paragonite and zinnwaldite, and may include synthetic micas such as fluorophlogopite. Clay platelets that may be used include, but are not limited to, ball clay, bentonite, smectite, hectorite, kaolinite, montmorillonite, saponite, sepiolite, sauconite, or combinations thereof. In some embodiments, mica, whether in platelet form or otherwise, may be included in the fire protection material 100 in order to provide improved blast resistance. In some embodiments, the microporous materials may include anisotropic materials, which have distinct thermal conductivity depending on their orientation. In some embodiments, the microporous materials may include intumescent materials.

Any one or more of the foregoing microporous materials, platelets, aerogels, mica, micro spheres, intumescent materials, endothermic materials, phase change materials, or other inorganic filler materials may be included in the fire protection material 100 in an amount of greater than 0 to about 60 percent by weight, about 0.1 percent by weight to about 50 percent by weight, about 5 percent by weight to about 30 percent by weight, or about 10 percent by weight to about 25 percent by weight based on the total weight of the fire protection material 100.

In some embodiments, the fire protection material 100 includes a compressive additive, which may be included as an additive 120, 130 entrained in the fiber matrix 100 or may be included as a layer adhered to the fiber matrix 110. The compressive additive may include a foam, such as an open or closed cell foam formed of polyurethane, polyethylene, ethylene propylene diene monomer (EPDM), polyethylene terephthalate (PET), silicone, and the like. In some embodiments, the compressive additive is a paper, such as an organic fiber paper (e.g., formed from nylon). In some embodiments, the compressive additive is an organic fiber, such as those described above. In some embodiments, the compressive additive may comprise an acrylic latex. In some embodiments, the compressive additive may be present in an amount of from about 2 percent by weight to about 50 percent by weight, at least about 2 percent by weight, at least about 5 percent by weight, at least about 10 percent by weight, at least about 15 percent by weight, at least about 20 percent by weight, at most about 50 percent by weight, at most about 40 percent by weight, at most about 30 percent by weight, or at most about 25 percent by weight based on a total weight of the fire protection material 100.

In one or more embodiments, the fire protection material 100 may be formed by paper making techniques including dry laying, batch sheet processes, or processes using delta formers, rotoformers, fourdiniers, or cylinder machines. In some embodiments, the fire protection material 100 may be formed using a dry laying technique without any binder, which may optionally include a needling process. In such embodiments, the fire protection material 100 may include long fibers having a length of at least 10 mm (e.g., 20-30 mm), which may be continuous or discontinuous fibers. In some embodiments, the fire protection material 100 is formed using a wet laid process wherein the additives 120, 130 include a binder that is well dispersed within the fiber matrix 110 and migration thereof is controlled using controlled drying systems such as convection ovens, radio frequency (RF), and/or microwave driers. In some embodiments, heated drums can be used to either limit migration (e.g., using alternative side heating or progressive heating) or intentionally migrate materials so select components optionally face toward or away from the adjacent cell to maximize protection Inorganic materials, such as those added as a gel phase, could migrate and be used on a hot side of the application to offer additional protection. In some embodiments, organic materials can be migrated away from a core of the material to enhance thermal performance at low temperatures (i.e., temperatures in normal operation) and enhance adhesion of optional tape backed or laminated layers. In some embodiments, the drying methods may control migration of an organic binder to evenly distribute the same through a thickness of the fire protection material 100.

In some embodiments, the fire protection material 100 comprises from about 0.1 percent by weight to about 50 percent by weight of long fibers in the fiber matrix 110 and does not include an organic binder material. In such embodiments, the long fibers are able to provide a structural skeleton to allow the wet laid product to be flexible in the absence of organic binder materials. In some embodiments, the fire protection material 100 does not include an organic binder and is produced using different vacuum pressures when forming the wet laid sheets to influence the density of the resulting wet laid sheet In some embodiments, the fire protection material 100 has a density of at most 10 g/cm$^3$, at most 7 g/cm$^3$, at most 5 g/cm$^3$, at most 4 g/cm$^3$, at most 2 g/cm$^3$, at most 1 g/cm$^3$, at most 0.5 g/cm$^3$, at least 0.025 g/cm$^3$, at least 0.05 g/cm$^3$, at least 0.1 g/cm$^3$, at least 0.25 g/cm$^3$, at least 0.5 g/cm$^3$, at least 1 g/cm$^3$, or any logical combination of the foregoing upper and lower bounds (e.g., 0.025 g/cm$^3$ to 5 g/cm$^3$ or 0.1 g/cm$^3$ to 5 g/cm$^3$).

In some embodiments, the fire protection material 100 may be formed into a complex 3D shape rather than a flat sheet. For example, the fire protection material 100 may be molded to match the shape of battery lids, side plates, or spacings between cells by either press forming or vacuum forming.

In any embodiment, the fire protection material 100 may include a tape backing (not shown). The tape backing may provide reinforcement should a cell fail, and some blast resistance is needed to help slow fire propagation between cells. In some embodiments, the tape backing may have a thickness about 10 micrometers to about 1 mm, about 10 micrometers to about 700 micrometers, about 10 micrometers to about 400 micrometers, about 10 micrometers to about 400 micrometers, about 10 micrometers, about 20 micrometers, about, 30 micrometers, about 40 micrometers, about 50 micrometers, about 60 micrometers, about 70 micrometers, about 80 micrometers, about 90 micrometers, or about 100 micrometers. The tape backing can be adhered directly to the fire protection material 100 (paper) using melt or pressure sensitive adhesives. In some embodiments, the tape backing can be a scrim of organic foils (such as those formed of polypropylene, polyethylene terephthalate, polytetrafluoroethylene, and the like) or metallic foils (such as those formed of Al, Sn, Cu, and the like). In some embodiments, the tape backing may comprise mica to increase blast resistance of the fire protection material 100.

In some embodiments, the fire protection material 100 comprises, based on a total weight of the fire protection material 100:

the inorganic fibers at 10 to 95 percent by weight, 10 to 90 percent by weight, 20 to 90 percent by weight, 30 to 80 percent by weight, 40 to 80 percent by weight, 40 to 70 percent by weight, 40 to 60 percent by weight, at least 20 percent by weight, at least 30 percent by weight, at least 40 percent by weight, at least 50 percent by weight, at least 60 percent by weight, or at least 70 percent by weight;

the microporous materials, platelets, aerogels, mica, micro spheres, intumescent materials, opacifiers or opacifying agents, endothermic materials, phase change materials, other inorganic filler materials, or combinations thereof at greater than 0 to 60 percent by weight; 0.1 to 50 percent by weight, 5 to 30 percent by weight, 10 to 25 percent by weight, at least 1 percent by weight; at least 5 percent by weight; at least 10 percent by weight, at least 20 percent by weight, at least 30 percent by weight;

the compressive additive at 0 to 50 percent by weight, at least 2 percent by weight, at least 5 percent by weight, at about 10 percent by weight, at least 15 percent by weight, at least 20 percent by weight, at most 50 percent by weight, at most 40 percent by weight, at most 30 percent by weight, or at most 25 percent by weight; and the binder (inorganic, organic, or combinations thereof) at 1 to 20 percent by weight, 5 to 15 percent by weight, at least 2 percent by weight, at least 5 percent by weight, or at least 10 percent by weight.

In any embodiment, the fire protection material 100 may include a blast resistant coating. In some embodiments, the coating may have a thickness of up to 20 mm, up to 10 mm, up to 5 mm, 0.05 to 20 mm, 0.1 to 10 mm, or 0.1 to 5 mm.

In some embodiments, the blast resistant coating is applied as a viscous dispersion or gel of hydrated inorganic materials, and dried to form the protective surface. Examples of inorganic materials include bentonite clay and dispersible $Al_2O_3$ (e.g., colloidal alumina). Without being bound by theory, it is believed that surface hydroxyl groups of these materials allow for inter-particle adhesion when the dried thereby yielding a hard, rigid surface coating that can withstand impact from small particles, even when subjected to flames as hot as 1100° C. This not only leaves the barrier in-tact, but protects the insulating layer of the fire protection material 100, which hinders the spread of the thermal event.

In some embodiments, the blast resistant coating comprises a silicone blend. The silicone blend coating allows the fire protection material 100 to still be flexible through the manufacturing process. In a thermal runaway scenario, the silicon blend coating is immediately subjected to extreme temperatures, which will oxidize the coating and ceramize it into a hard, rigid layer that can withstand impact from particulates. In some embodiments, the silicone blend comprises a crosslinking system of polysiloxane, such as poly(dimethylsiloxane), poly(diphenylsiloxane), poly(methylphenylsiloxane) and co-polymers thereof. The silicone blend may also comprise at least one inorganic additive or filler. Such additives and fillers may include, but are not limited to, endothermic materials (e.g., aluminum trihydroxide, magnesium hydroxide, $CaCO_3$), intumescent additives (e.g., expandable vermiculite, $CaCO_3$), fluxing agents (e.g., glass frits, zinc borate), reinforcing additives (e.g., glass fibers, wollastonite, mica), aerogels, or combinations thereof. The additives and fillers may help form a strong, ceramized layer when the coating is fired. For example, in a silicone blend including a fluxing agent, the fluxing agent may cause the melting of the surface of the fibers within the silicone blend or the fire protection material 100. This helps bond the network to oxidized silicone ($SiO_2$) to form an extended rigid coating and prevent cracking. Blended, resinous silicone coatings can be applied via spraying, for low-viscosity blends, or can be applied via a roller coating apparatus, blade coater or slot die coater for low to high-viscosity blends. Silicones utilizing room-temperature vulcanizing (RTV) chemistries can be cured for up to 24 hours, with curing rate being accelerated by increased humidity, temperature, or the use of appropriate catalysts. Low-temperature vulcanizing (LTV) silicones will cure at slightly elevated temperatures, taking up to 10 hours, by utilizing a peroxide radical initiator and vinyl, acrylate or methacrylate silicone pendant functionalities. The curing temperature of LTV silicones depends upon the activation temperature of the catalyst, but can range between 30-250° C. Alternatively, ultraviolet-activated radical initiators can be used to cure the resin via a UV lamp.

Figure 3:
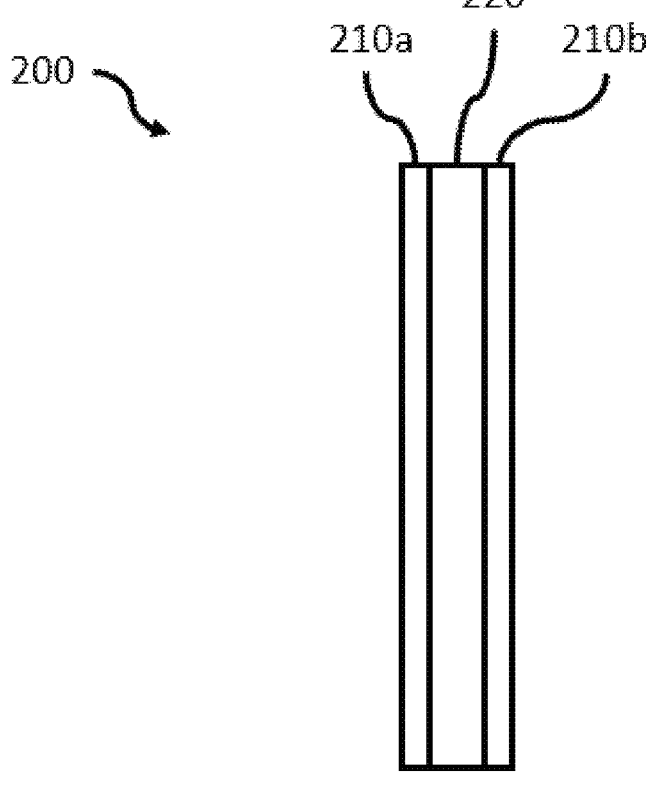
FIG. 3 is a fiber-containing fire protection material according to an embodiment of the present disclosure.

Turning to FIG. 3, in some embodiments, the fire protection material 200 may be a laminate comprising a compressive layer 220 and one or more fire protection layers 210a, 210b. In some embodiments, one or more of the fire protection layers 210a, 210b may be the same as the fire protection material 100 described above. In one or more embodiments, the compressive layer 220 comprises the same material as the compressive additive described above. The compressive layer 220 may be adhered to the one or more fire protection layers 210a, 210b using melt or pressure sensitive adhesives. In some embodiments, any of the compressive layer 220 and one or more fire protection layers 210a, 210b may include a tape backing, such as that described above. In some embodiments, the compressive layer 220 does not include inorganic fibers. In some embodiments, the compressive layer 220 consists of the compressive additive.

Figure 4:
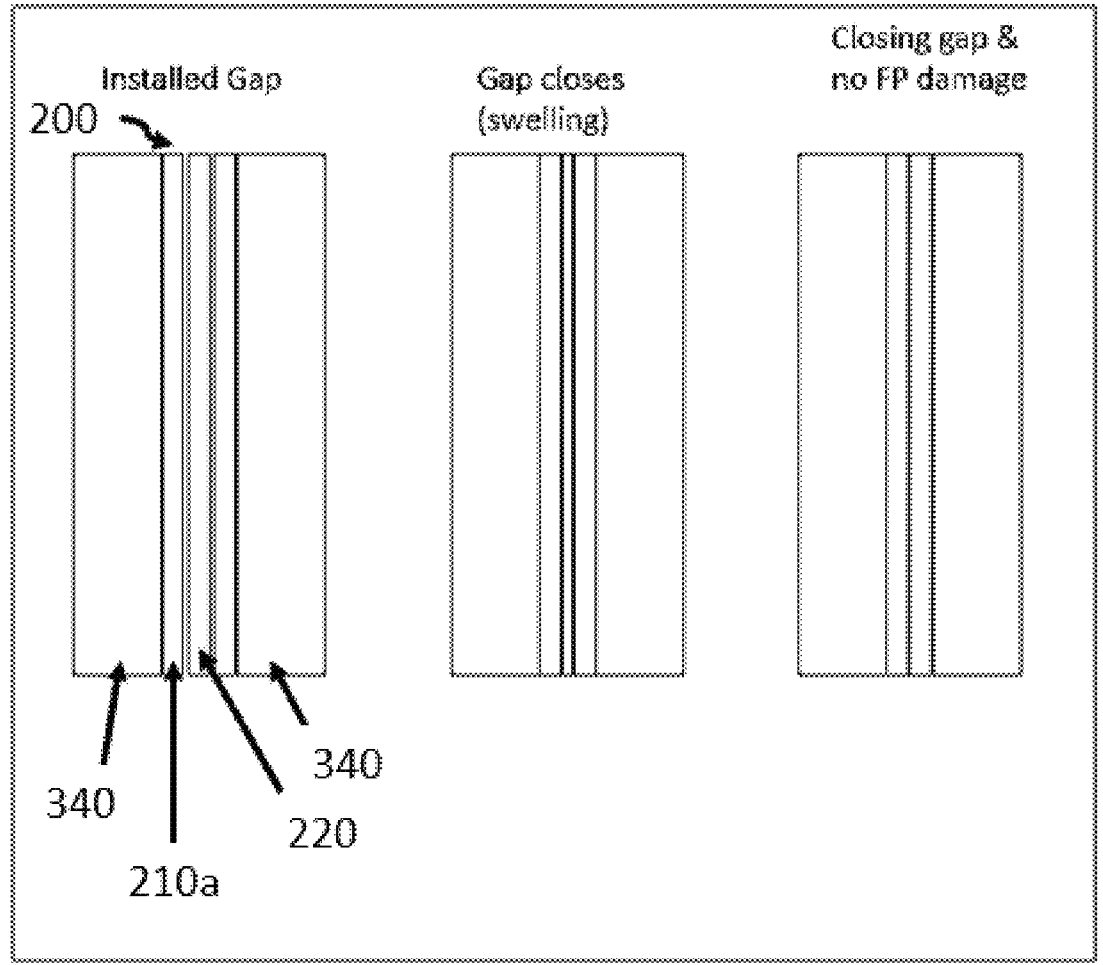
FIG. 4 is a fiber-containing fire protection material according to an embodiment of the present disclosure disposed between lithium-ion battery cells.

The laminate form of the fire protection material 200 optimizes the compressibility of materials with the changing environment on battery packs built from multiple battery cells. Cells are known to swell in service leading to a reduction in gap size that can compress and damage fire protection materials. Some compression is necessary to ensure material remains in place (i.e., does not slump) in use through vibration such as in EV applications. As shown in FIG. 4, when the fire protection material 200 is used between LiB cells, the swelling of the cells does not damage the fire protection material 200 due to its compression characteristics. Although not shown, the fire protection material 100 is able to provide similar results to those shown in FIG. 4.

In some embodiments, the fire protection material is formed as a fire protection film. The fire protection film may be a thin film that can be dipped and sprayed onto the case of the battery pack to offer thermal and electrical protection. The fire protection film is formed of fibers, such as those described for the fiber matrix 110 above, and additives, such as the additives 110, 120 described above. In some embodiments, the fire protection film may be prepared using mixers (dry or wet, low or high shear, etc.). In some embodiments, the fire protection film comprises colloids and/or other inorganic binders and organic binders such as latex and/or cellulose. In any embodiments, the fire protection film may be formed as a wet solution that is dried onto a surface (e.g., a surface of a cell or battery pack or another substrate).

In some embodiments, the fire protection film may be applied onto a tape backing, such as that described above. In such embodiments, the fire protection film may be applied to the tape backing by spray, roller, or dip coating a solution of the fibers and the additives, including an organic binder such as cellulose, latex, and/or PVA onto the tape backing.

In any embodiment, the fire protection materials described herein may be used to selectively cover 10% to 100% of the cell-contacting surface and may be adhered directly to the cells using a melt or pressure sensitive adhesive. In some embodiments, a combination of fire protection materials described herein (the fire protection materials 100, 200 and the fire protection film) may be used within a LiB battery pack. In such embodiments, the fire protection materials may be position as needed within the LiB battery pack, for example, between cells or between the array of cells and the lid of the housing.

EXAMPLES

Comparative Example 1

Into 3 gallons of water, 32.83 g of E-glass microfiber with average diameter of 0.6 μm was broken up and stirred vigorously until evenly dispersed. 3.94 mL of a 50% anionic acrylic dispersion (Hycar 26083, Lubrizol) was added to the slurry. Finally, 5.65 mL 5% alum was added to the slurry. The mixture was transferred to a water-tight caster on top of a wire-mesh screen. A vacuum was pulled from beneath, dewatering the slurry through the metal screen. The resulting wet paper was compressed, then dried at 65° C.

The dried paper had an average thickness of 2.59 mm and a density of 162 kg/m$^3$. The thermal conductivity of the fire protection media was then tested under ASTM C518 at a density of 204 kg/m$^3$. The measured thermal conductivity is listed in Table 1 below.

Example 1

Hi-Sil ABS (PPG Industries, Inc.) is a commercial precipitated silica with average particle size 40 μm. Into 3 gallons of water, 22.44 g of Hi-Sil ABS was dispersed with vigorous stirring. 14.21 g of E-glass microfiber with average diameter of 0.6 μm was broken up into the mixing vessel and stirred until evenly dispersed. 4.26 mL of a 50% anionic acrylic dispersion (Hycar 26083, Lubrizol) was added to the slurry. Finally, 6.11 mL 5% alum was added to the slurry. The mixture was transferred to a water-tight caster on top of a wire-mesh screen. A vacuum was pulled from beneath, dewatering the slurry through the metal screen. The resulting wet paper was compressed, then dried at 65° C.

The dried composite paper had an average thickness of 2.11 mm and a density of 190 kg/m$^3$. The thermal conductivity of the fire protection media was then tested under ASTM C518 at a density of 250 kg/m$^3$. The measured thermal conductivity is listed in Table 1.

Figure 5:
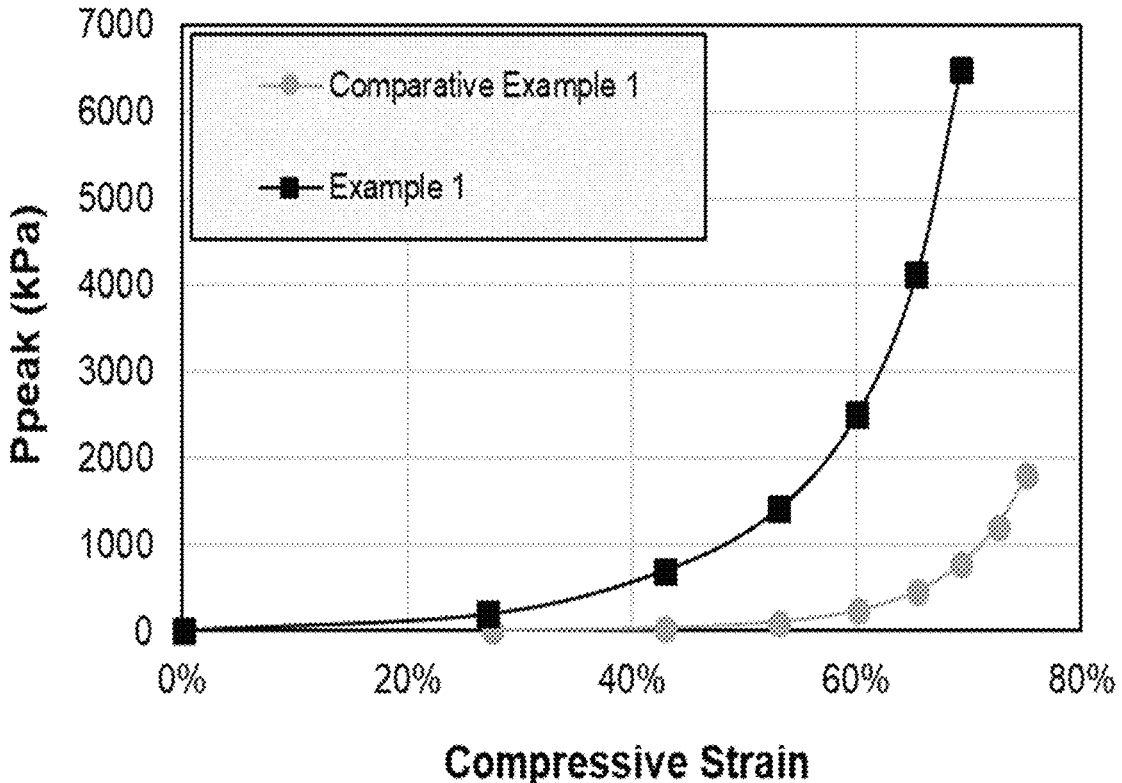
FIG. 5 is a graph comparing the compressive strain measured in Example 1 and Comparative Example 1.

The compressive strain of the fire protection media of Example 1 and Comparative Example 1 were tested under a modified version of ASTM D3574 TestC. The results are shown in FIG. 5.

In addition to improvement in thermal insulation properties, the compressive properties of this battery pack fire protection material were also enhanced by the silica additives. Despite silica being a brittle, inelastic material the addition of precipitated silica particles improved the material's compression behavior. This is evidenced by the data illustrated in FIG. 5, wherein this fiber/silica composite exhibits a greater elastic response under compression when compared to the filler-less material of Comparative Example 1.

Comparative Example 2

Into 3 gallons of water, 92 g of Insulfrax 3010 glass fiber (Alkegen) with fiber index >70% was broken up and stirred vigorously until evenly dispersed. 13 mL of a 42% cationic acrylic dispersion (Ottopol K-12T, Gellner Industrial) was added to the slurry. The mixture was transferred to a water-tight caster on top of a wire-mesh screen. A vacuum was pulled from beneath, dewatering the slurry through the metal screen. The resulting wet paper was compressed, then dried at 65° C.

The thermal conductivity of the fire protection media was then tested under ASTM C518 at a density of 148 kg/m$^3$. The measured thermal conductivity is listed in Table 1.

Example 2

Hi-Sil ABS (PPG Industries, Inc.) is a commercial precipitated silica with average particle size 40 μm. Into 2 gallons of water, 46 g of Hi-Sil ABS was dispersed with vigorous stirring. 46 g of Insulfrax 3010 glass fiber (Alkegen) with fiber index >90% was broken up into the mixing vessel and stirred until evenly dispersed. 13 mL of a 42% cationic acrylic dispersion (Ottopol K-12T, Gellner Industrial) was added to the slurry. The mixture was transferred to a water-tight caster on top of a wire-mesh screen. A vacuum was pulled from beneath, dewatering the slurry through the metal screen. The resulting wet paper was compressed, then dried at 65° C.

The dried composite paper had an average thickness of 5 mm and a density of 175 kg/m$^3$. The thermal conductivity of the fire protection media was then tested under ASTM C518 at a density of 286 kg/m$^3$. The measured thermal conductivity is listed in Table 1 below.

Figure 6:
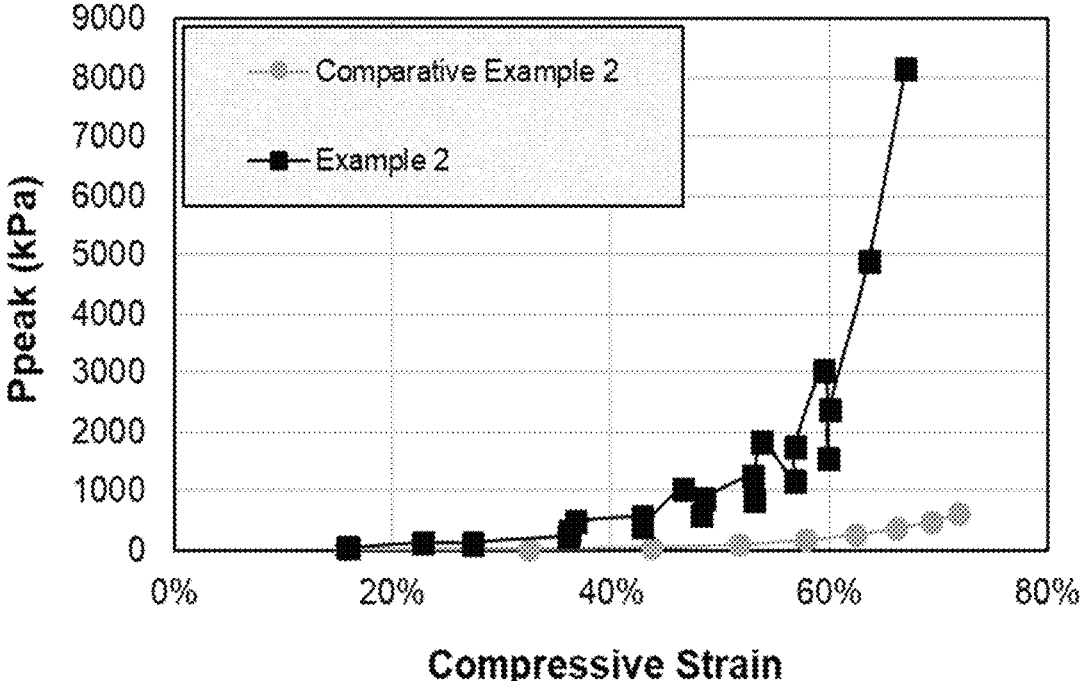
FIG. 6 is a graph comparing the compressive strain measured in Example 2 and Comparative Example 2.

The compressive strain of the fire protection media of Example 2 and Comparative Example 2 were tested under a modified version of ASTM D3574 Test C. The results are shown in FIG. 6.

In addition to improvement in thermal insulation properties, the compressive properties of this battery pack fire protection material were also enhanced by the silica additives. Again, despite silica being a brittle, inelastic material the addition of precipitated silica particles improved the material's compression behavior. This is evidenced by the data illustrated in FIG. 6, wherein this fiber/silica composite exhibits a greater elastic response under compression when compared to the filler-less material of Comparative Example 2.

Comparative Example 3

Into 3 gallons of water, 40.09 g of Isofrax 4010 glass fiber (Alkegen) with fiber index >85% was broken up and stirred vigorously until evenly dispersed. 4.22 mL of a 50% anionic acrylic dispersion (Hycar 26083, Lubrizol) was added to the slurry. Finally, 4.22 mL 5% alum was added to the slurry. The mixture was transferred to a water-tight caster on top of a wire-mesh screen. A vacuum was pulled from beneath, dewatering the slurry through the metal screen. The resulting wet paper was compressed, then dried at 65° C.

The dried paper had an average thickness of 3.30 mm and a density of 146 kg/m$^3$. The thermal conductivity of the fire protection media was then tested under ASTM C518 at a density of 334 kg/m$^3$. The measured thermal conductivity is listed in Table 1.

Example 3

Into 2 gallons of water, 10.12 g of silicon carbide (particle diameter 4-7 μm) was dispersed with vigorous stirring. 54 g of Isofrax 4010 glass fiber (Alkegen) with fiber index >85% was broken up into the mixing vessel and stirred until evenly dispersed. 6.75 mL of a 50% anionic acrylic dispersion (Hycar 26083, Lubrizol) was added to the slurry. Finally, 6.75 mL 5% alum was added to the slurry. The mixture was transferred to a water-tight caster on top of a wire-mesh screen. A vacuum was pulled from beneath, dewatering the slurry through the metal screen. The resulting wet paper was compressed, then dried at 65° C.

Figure 7:
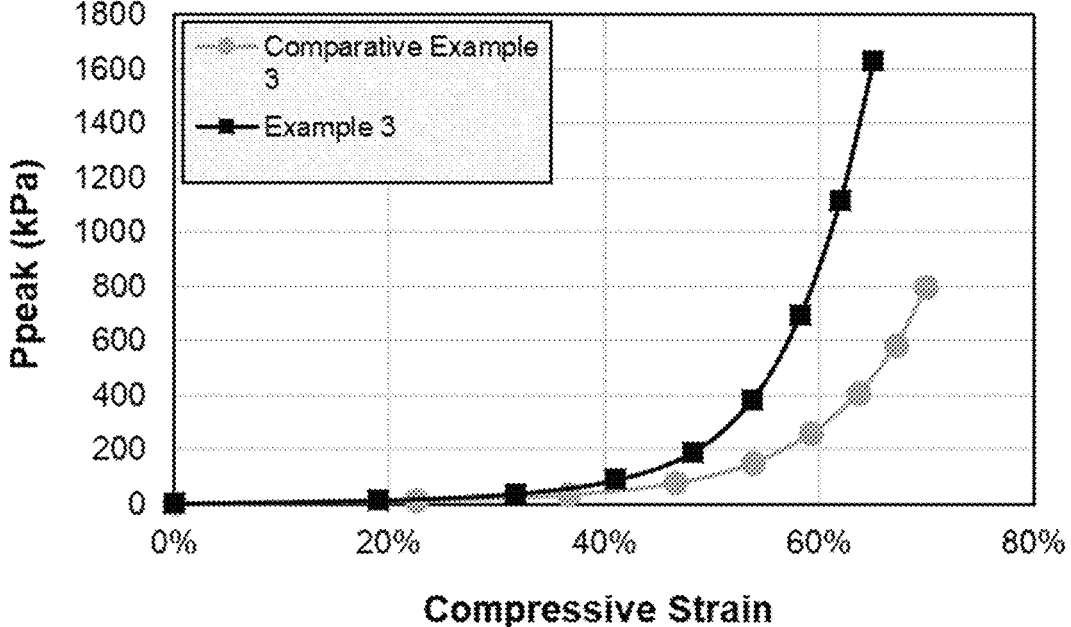
FIG. 7 is a graph comparing the compressive strain measured in Example 3 and Comparative Example 3.

The dried composite paper had an average thickness of 3.17 mm and a density of 249 kg/m$^3$. The thermal conductivity of the fire protection media was then tested under ASTM C518 at a density of 314 kg/m$^3$. The measured thermal conductivity is listed in Table 1. The improved compression behavior is illustrated in FIG. 7, wherein this fiber/silicon carbide composite exhibits a greater elastic response under compression when compared to the filler-less material of Comparative Example 3.

TABLE 1

| Mean Temperature (° C.) | Comparative Example 1 | Example 1 | Comparative Example 2 | Example 2 | Comparative Example 3 | Example 3 |
|---|---|---|---|---|---|---|
| 100 | 36.6 | 36.5 | 41.0 | 41.9 | 44.5 | 51.7 |
| 200 | 43.6 | 41.6 | 54.3 | 50.0 | 56.3 | 59.1 |
| 300 | 49.5 | 46.2 | 64.3 | 59.7 | 64.0 | 66.4 |
| 400 | 54.5 | 50.3 | | | 75.7 | 73.6 |
| 500 | 58.6 | 53.8 | | | 88.7 | 80.8 |

As described herein, the fire protection materials are controlled compression durable materials that survive the lifetime of the battery cell without impacting the thermal, electrical, and fire protection performance of the materials. The fire protection materials described herein may be thinner than existing technologies thereby maximizing the energy density of the LiB battery pack.

What is claimed is:

1. A fire protection material comprising:
at least 10 wt % of inorganic fibers;
at least 5 wt % of a particulate additive dispersed within the inorganic fibers, the particulate additive selected from precipitated silica, silicon carbide, or combinations thereof; and
at least 2 wt % of a binder dispersed within the inorganic fibers;
wherein the inorganic fibers, the particulate additive, and the binder account for at least 60 wt % of the fire protection material;
wherein the fire protection material does not comprise platelets.

2. The fire protection material of claim 1, wherein the inorganic fibers comprise refractory ceramic fiber (RCF), low bio-persistent (LBP) fiber, alkaline earth silicate (AES) fiber, polycrystalline wool (PCW), or a combination thereof.

3. The fire protection material of claim 1, wherein the particulate additive comprises the precipitated silica at 5 to 60 wt %.

4. The fire protection material of claim 1, wherein the binder comprises latex, cellulose, silicones, polyvinyl alcohol, organic fibers, or a combination thereof.

5. The fire protection material of claim 4, comprising 5 to 15 wt % of the binder.

6. The fire protection material of claim 4, wherein the binder comprises organic fibers that are dispersed within the inorganic fibers and heated to bind the fire protection material.

7. The fire protection material of claim 1, further comprising 2 to 40 wt % of a compressive additive selected from polyurethane, polyethylene, ethylene propylene diene monomer (EPDM), polyethylene terephthalate (PET), silicone, acrylic latex, organic fibers, or combinations thereof dispersed within the inorganic fibers.

8. A fire protection article comprising:
the fire protection material of claim 1; and
a coating layer disposed on at least one surface of the fire protection material;
wherein the coating layer comprises bentonite clay, dispersible $Al_2O_3$, a cross-linkable silicone, or combinations thereof.

9. The fire protection article of claim 8, wherein the coating layer comprises a polysiloxane and an additive selected from aluminum trihydroxide, magnesium hydroxide, $CaCO_3$, expandable vermiculite, a fluxing agent, inorganic fibers, wollastonite, mica, aerogels, or combinations thereof.

10. The fire protection article of claim 9, wherein the coating layer comprises the fluxing agent and inorganic fibers.

11. The fire protection article of claim 9, wherein the coating layer is configured to be ceramized at temperatures of 650° C. or greater.

12. The fire protection article of claim 9, wherein the coating layer comprises the cross-linkable silicone and is cured using heat or ultraviolet radiation.

13. A lithium-ion battery comprising:
a housing comprising a lid;
a plurality of cells contained within the housing; and
the fire protection article of claim 8 disposed between at least two of the plurality of cells or between the plurality of cells and the lid.

14. A fire protection article comprising:
a first layer of the fire protection material of claim 1; and
a compressive layer laminated to the first layer of the fire protection material;
wherein the compressive layer comprises polyurethane, polyethylene, ethylene propylene diene monomer (EPDM), polyethylene terephthalate (PET), silicone, acrylic latex, organic fibers, or combinations thereof; and
wherein the compressive layer does not comprise inorganic fibers.

15. The fire protection article of claim 14, further comprises a second layer of the fire protection material laminated to the compressive layer opposite the first layer of the fire protection material.

16. The fire protection article of claim 14, further comprising a coating layer disposed on at least one surface of the first layer of the fire protection material, wherein the coating layer comprises bentonite clay, dispersible $Al_2O_3$, a cross-linkable silicone, or combinations thereof.

17. The fire protection article of claim 16, wherein the coating layer comprises the fluxing agent and inorganic fibers.

18. A lithium-ion battery comprising:
a housing comprising a lid;
a plurality of cells contained within the housing; and
the fire protection article of claim 14 disposed between at least two of the plurality of cells or between the plurality of cells and the lid.

19. A lithium-ion battery comprising:
a housing comprising a lid;
a plurality of cells contained within the housing; and
the fire protection material of claim 1 disposed between at least two of the plurality of cells or between the plurality of cells and the lid.

20. A fire protection material comprising:
at least 60 wt % of inorganic fibers;
at least 5 wt % of an additive dispersed within the inorganic fibers, the additive selected from particles, platelets, aerogels, a foam, or combinations thereof; and at least 2 wt % of a binder dispersed within the inorganic fibers.

21. A fire protection material comprising:

at least 40 wt % of inorganic fibers;

at least 30 wt % of a particulate additive dispersed within the inorganic fibers, the particulate additive selected from precipitated silica, silicon carbide, or combinations thereof;

at least 10 wt % of a compressive additive dispersed within the inorganic fibers, the compressive additive selected from polyurethane, polyethylene, ethylene propylene diene monomer (EPDM), polyethylene terephthalate (PET), silicone, acrylic latex, organic fibers, or combinations thereof; and at least 2 wt % of a binder dispersed within the inorganic fibers.

* * * * *